3,466,167
REMOVAL OF IMPURITIES FROM NICKEL SULFIDE

Alexander Illis, Copper Cliff, Ontario, and Alan Manson, Oakville, Ontario, Canada, assignors to The International Nickel Company, Inc., New York, N.Y., a corporation of Delaware
No Drawing. Filed Aug. 19, 1966, Ser. No. 573,496
Claims priority, application Canada, Sept. 14, 1965, 940,557
Int. Cl. C22b *1/10;* C22c *19/00*
U.S. Cl. 75—1                                22 Claims

ABSTRACT OF THE DISCLOSURE

Impure nickel sulfide is selectively chlorinated with gaseous chlorine at a temperature between about 400° F. and 700° F. to chlorinate at least one impurity selected from the group consisting of copper, cobalt, lead, arsenic and iron. The selectively chlorinated impurities are then leached from the nickel sulfide. Leaching can be effected by bubbling chlorine through water or by aerating an ammoniacal ammonium carbonate solution.

---

The present invention relates to the purification of nickel sulfidic materials and more particularly to such a process wherein metal impurities are selectively chlorinated and are removed by leaching.

It is well known that a number of metal impurities, e.g., copper, cobalt, lead and arsenic, are associated with nickel sulfidic materials. The art has endeavored to separate and recover these impurities by various techniques. For example, the sulfidic material has been roasted and the resulting oxidic material given a high temperature chlorination treatment to volatilize chlorides of impurity metals such as copper. However, this useful process cannot be employed to remove cobalt from nickel sulfidic materials. Other processes have solubilized all the metal sulfides and relied on hydrometallurgical techniques to separate nickel from cobalt, nickel from copper or nickel from iron. These expensive wet techniques require many closely controlled operations including elaborate provisions for separating cobalt from nickel. Since nickel and cobalt display very similar chemical properties, it has been found that prior hydrometallurgical separation techniques employed for separating them have met with limited success. Although many attempts were made to overcome the foregoing difficulties and other difficulties, none, as far as we are aware, was entirely successful when carried into practice commercially on an industrial scale.

It has now been discovered that impurities, e.g., copper, iron, cobalt, lead and arsenic, present in nickel sulfidic materials can be selectively chlorinated and subsequently leached from nickel sulfidic materials to produce purified nickel sulfide residue.

It is an object of the present invention to provide a procsss for selectively chlorinating nickel sulfidic materials contaminated with metal impurities to solubilize and subsequently remove the impurities associated therewith.

Another object of the invention is to provide a process for the elimination from nickel sulfidic material of metal impurities which display similar chemical characteristics to nickel.

The invention also contemplates providing a process for eliminating cobalt and copper from nickel sulfidic materials and simultaneously providing for the separation of cobalt and copper from such materials.

Other objects and advantages will become apparent from the following description.

Generally speaking, the present invention contemplates heating particulate nickel sulfidic material containing chlorinatable impurities, e.g., cobalt, copper, lead, arsenic, iron, etc., to a temperature of about 400° F. to about 700° F., contacting the heated nickel sulfidic material with a small amount of chlorine effective to chlorinate the impurities, cooling the thus-treated material and leaching the cooled material to remove the chlorinated impurities and to produce purified nickel sulfide. Leaching of the selectively chlorinated nickel sulfidic material with water will effectively remove a substantial portion of the cobalt but other lixiviants are required to remove other chlorinated impurities such as copper, iron, lead and arsenic. The removal of copper, cobalt, iron, lead and arsenic from the selectively chlorinated material can be accomplished with a lixiviant such as chlorine water. Ammoniacal ammonium carbonate solution can be employed to leach selectively chlorinated cobalt, copper, lead and arsenic but not iron.

The particle size of the nickel sulfidic material being treated can vary over a wide range. However, finely divided nickel sulfidic material, e.g., not larger than about 100 mesh or even more advantageously not larger than 200 mesh, is more efficiently purified by the process of this invention. As it is well known in the art, finely divided solid materials present large surface areas which are more conducive to gas-solid and liquid-solid reactions. Large surface areas can be produced in solid materials by techniques other than comminution. Thus, in the present instance the nickel sulfidic material can be melted and thereafter granulated by quenching in water to produce porous impure nickel sulfide granules having high surface area despite a particle size of a relatively coarse order. Such granules are highly susceptible to treatment in accordance with the process of the present invention. The term "particulate nickel sulfidic material," as used herein, relates to any physical form of the aforesaid material that presents large surface areas for exposure to gaseous chlorine and thereafter to the leaching solution.

The selective chlorination step is advantageously conducted in a rotary kiln apparatus providing intimate contact between the relatively finely divided solid sulfidic material and the gaseous chlorine. Thus, a rotary kiln advantageously is employed although a suspension roaster or a fluid bed reactor is suitable for the selective chlorination treatment.

Selective chlorination of the sulfidic material is achieved by providing a closely controlled set of conditions among which one is the temperature. The temperature of selective chlorination must be maintained at between about 400° F. and about 700° F. because at temperatures below 400° F. only negligible quantities of any cobalt and/or copper present are chlorinated and at temperatures exceeding 700° F. undesirably large quantities of nickel are chlorinated which upon subsequent leaching are dissolved in the lixiviant and must be recovered therefrom.

The required selectivity in chlorination is achieved not only by regulating the chlorination temperature between about 400° F. to about 700° F. but also by control of the amount of chlorine. The amount of chlorine added is controlled to be about equal to or slightly in excess of that amount required on a weight basis to react with the copper and cobalt present in the nickel sulfide to form cuprous chloride and cobaltous chloride but the chlorine should not exceed about four times the stoichiometric amounts necessary to form cuprous chloride, cobaltous chloride and the chlorides of the other impurities. The chlorine additions are calculated on the basis that the lower valent chlorides of the impurities are formed, e.g., cuprous chloride, ferrous chloride, etc. Excessive amounts of chlorine above these levels is undesirable in that greater losses of nickel are encountered. The gaseous chlorine is advantageously diluted with inert gases such as carbon dioxide and nitrogen.

In carrying the invention into practice, it is preferred to heat a particulate nickel sulfidic material, e.g., nickel sulfide concentrate containing, by weight, up to about 3% copper, up to about 5% cobalt, up to about 0.5% iron, up to about 0.1% lead, up to about 0.1% arsenic, about 63% to about 73% nickel and the balance essentially sulfur and having a particle size not larger than about 200 mesh, to a temperature of about 400° F. to about 700° F. in a rotary kiln through which, during a heating period of up to about 3 hours, e.g., about 5 minutes to about 3 hours with the range of about 10 minutes to about 60 minutes being particularly effective in enhancing copper chlorination, an atmosphere containing a small but effective amount of chlorine to chlorinate the cobalt, copper, iron, lead and arsenic, e.g., about 2 to about 3 times the theoretical amount required to combine with these impurities, is passed. The chlorine concentration in the atmosphere is, by volume, about 1% to about 50%, e.g., about 10% to about 30%, and the balance essentially nitrogen or carbon dioxide, with the free oxygen content not exceeding about 5% and the water vapor content being up to about 5%. Flue gas obtained by the essentially complete combustion of a fuel such as oil forms a satisfactory diluent to carry the chlorine.

After the selective chlorination treatment, the material is cooled and leached to remove the chlorinated impurities. Advantageously, the cooled chlorinated material is slurried with water to form a slurry containing about 20% to about 50% solids. The temperature of the slurry is maintained below about 80° F. while bubbling chlorine therethrough. The amount of chlorine bubbled through the slurry is controlled to maintain a redox potential in the slurry of about plus 400 millivolts to about plus 600 millivolts, e.g., plus 500 millivolts, as measured by the platinum electrode versus the saturated calomel electrode. Although gaseous chloride is our advantageous reagent for maintaining the desired redox potential in the slurry during leaching, other reagents such as hydrogen peroxide and ozone can alternatively be employed. The chlorine-water leach will remove to a substantial extent selectively chlorinated cobalt, copper, lead, arsenic and iron from the chlorinated nickel sulfidic material.

The selectively chlorinated nickel sulfidic material can alternatively be treated with an ammoniacal ammonium carbonate solution to remove cobalt, copper, lead and arsenic. The selectively chlorinated nickel sulfide material is cooled and slurried with an aqueous ammoniacal ammonium carbonate solution to form a slurry containing about 20% to about 50% solids. The aqueous solution contains, by weight, from about 2% to about 12% ammonia and from about 1% to about 6% carbon dioxide, is maintained at a temperature of about 70° F. to about 140° F., and is aerated to establish a redox potential up to about plus 200 millivolts, e.g., about minus 100 millivolts to about plus 200 millivolts.

If it is desired to make an initial separation of cobalt, the selectively chlorinated nickel sulfidic material can be first leached with water after which the remaining chlorinated impurities can be removed by the hereinabove described chlorine water leach, or by the ammoniacal ammonium carbonate solution leach. When employing an initial water leach, the selectively chorinated nickel sulfidic material is slurried with water to form a slurry of about 20% to about 50% solids. The slurry is maintained in an agitated state at temperatures of about 70° F. to about 200° F. for about 5 minutes to about 60 minutes, e.g., ten minutes. The thus-treated slurry is then filtered and the filtrate, which contains essentially no copper, is treated for cobalt recovery. The residue is then re-slurried to about 20% to about 50% solids and is leached with chlorine water or an ammoniacal ammonium carbonate solution as outlined hereinbefore to remove the remaining chlorinated impurities.

Lower copper contents in the purified nickel sulfide after leaching, either with chlorine water or ammoniacal ammonium carbonate, can be achieved by separating the nickel sulfide from the pregnant leach solution in as short a time as practicable. Another advantage of such separation of the nickel sulfide from the pregnant leach solution is that losses of nickel by dissolution in the leaching solution are minimized. In order to achieve most efficient removal of copper from the chlorinated nickel sulfidic material, a period of no longer than about 20 minutes should elapse between completion of leaching and separation of the bulk of the pregnant leach solution from the purified nickel sulfide. Effective separation can be accomplished by any well known means such as filtering centrifuging, wet cyclone separating, etc. Techniques such as thickening or settling are ineffective because the inherent slowness of these techniques requires the purified nickel sulfide to remain in contact with the pregnant leach solution for an undesirably long period. Although more rapid separation techniques are advantageously employed, relatively slower separation techniques can be utilized in some instances as long as steps are taken to maintain the redox potentials of the various pregnant leach solutions within the hereinbefore recited limits. It might be noted that some increase in cobalt extraction occurs with increasing periods of contact between the pregnant solution and the purified nickel sulfide, but the decrease of copper extraction and the increase of nickel dissolution attendant thereon make rapid phase separation more advantageous.

For the purpose of giving those skilled in the art a better understanding of the invention the following illustrative examples are given:

EXAMPLE I

Finely ground and dry nickel sulfide obtained from the flotation of slowly cooled nickel-copper matte, analyzing, by weight, 72.2% nickel, 0.66% copper, 0.84% cobalt, 0.28% iron, 0.042% lead, 0.089% arsenic and the balance essentially sulfur, was treated in a rotary kiln with a countercurrent flow of a gaseous mixture containing about 15% chlorine and about 85% nitrogen by volume. The chlorine addition to the charge, as indicated by the weight increase thereof during chlorination, was equivalent to about 3.6% by weight of the nickel sulfide which is also equivalent to about two times the theoretical amount necessary to form chlorides of the contained impurities and the charge was maintaiend at about 600° F. for one hour. The cooled product was slurried with water to about 25% solids and the copper, cobalt, iron, lead and arsenic leached from the nickel sulfide by agitating the slurry over a thirty minute period while chlorine equivalent to 1.8% by weight of the solids was continuously bubbled through the slurry. This amount of chlorine provided an oxiding redox potential of plus 500 millivolts within the slurry and enabled high extraction of copper, iron, lead and arsenic during leaching. The solid nickel sulfide product, after filtering, washing and drying, was analyzed giving the results below:

|  | Percent Feed Weight | Percent Cu | Percent Co | Percent Ni | Percent Fe | Percent Pb | Percent As |
| --- | --- | --- | --- | --- | --- | --- | --- |
| Sulfidic feed | 100 | 0.66 | 0.84 | 72.2 | 0.28 | 0.042 | 0.089 |
| Kiln discharge | 103.6 | 0.63 | 0.81 | 69.5 | 0.27 | 0.04 | 0.086 |
| Sulfide product | 96 | 0.057 | 0.23 | 71.4 | 0.10 | 0.012 | 0.030 |
| Extraction, percent |  | 92 | 74 | 5 | 66 | 73 | 67 |

EXAMPLE II

Finely ground and dry nickel sulfide obtained from the flotation of slowly cooled nickel-copper matte of the same composition as in Example I was treated in a rotary kiln with a countercurrent flow of a gaseous mixture containing about 15% chlorine and about 85% nitrogen by volume. The chlorine addition to the charge, as indicated by the weight increase thereof during chlorination, was equivalent to about 2% by weight of the nickel sulfide which is equivalent to about 1.1 times the theoretical amount required to form the chlorides of the contained impurities and the charge was maintaiend at a temperature of about 600° F. for one hour. The cooled product was water-leached at approximately 150° F. for 10 minutes and filtered. The filtered solids were slurried with fresh water and treated by bubbling chlorine into the agitated slurry at 70° F. and at 50% solids for one hour. The total chlorine consumed was equivalent to about 3.8% by weight of solids. The solid nickel sulfide product was analyzed giving the results below:

about 3% copper, up to about 5% cobalt, up to about 0.5% iron, up to about 0.1% lead, up to about 0.1% arsenic, about 63% to about 73% nickel and the balance essentially sulfur, provided that sulfur is present in quantities sufficient to form $Ni_3S_2$ and in quantities insufficient to form CuS with any copper present.

Thus, the present invention is particularly applicable to a nickel sulfide concentrate from a slow-cooled matte separation process. Such a nickel sulfide concentrate usually contains, by weight, up to about 3% copper, up to about 1% cobalt, up to about 0.1% lead, up to about 0.1% arsenic, up to about 0.5% iron, about 26% sulfur and the balance essentially nickel. Upon selective chlorination and appropriate leaching the copper content can be lowered to about 0.06%, the cobalt to about 0.19%, the lead to about 0.011%, the arsenic to about 0.03% and the iron to about 0.1%.

|  | Percent Feed Weight | Percent Cu | Percent Co | Percent Ni | Percent Fe | Percent Pb | Percent As |
|---|---|---|---|---|---|---|---|
| Sulfidic feed | 100 | 0.66 | 0.84 | 72.2 | 0.28 | 0.042 | 0.089 |
| Kiln discharge | 102 | 0.65 | 0.82 | 70.8 | 0.27 | 0.042 | 0.061 |
| H₂O-leached solids | 99 | 0.66 | 0.30 | 71.3 | 0.28 | 0.040 | 0.057 |
| Sulfide product | 96 | 0.08 | 0.27 | 71.6 | 0.06 | 0.013 | 0.024 |
| Extraction, percent | | 88 | 69 | 4.6 | 80 | 70 | 74 |

EXAMPLE III

A sample of nickel sulfide, treated with chlorine as in the previous example, was leached for 10 minutes at 50% solids and at 140° F. with an ammoniacal ammonium carbonate solution containing 6% ammonia and 4% carbon dioxide. Vigorous stirring was employed and air was bubbled through the slurry continuously. The slurry was filtered and the solids were washed, first with an ammoniacal solution and then with water. The pertinent results are tabulated below:

Purified nickel sulfide produced in accordance with our invention has a wide range of utility. Particulate purified nickel sulfide can be formed into granules and fluid bed roasted in accordance with the process described in U.S. Patent No. 3,094,409 to produce nickel oxide granules which can be employed to produce nickel salts or in nickel plating or as an alloying addition in the steel industry. As illustrated by Example IV, nickel sulfide, purified by the process of our invention, can be autogenously converted to metallic nickel by surface blowing

|  | Percent feed weight | Percent Cu | Percent Co | Percent Ni | Percent Pb | Percent As |
|---|---|---|---|---|---|---|
| Sulfidic feed | 100 | 0.66 | 0.84 | 72.2 | 0.042 | 0.089 |
| Kiln discharge | 102 | 0.65 | 0.82 | 70.8 | 0.042 | 0.061 |
| Sulfide product | 95 | 0.09 | 0.29 | 72.2 | 0.029 | 0.037 |
| Extraction, percent | | 87 | 67 | 5.0 | 40 | 61 |

EXAMPLE IV

A matte separation product of nickel sulfide analyzing by weight, 0.86% cobalt, 0.63% copper, 0.28% iron, 0.049% lead, 0.069% arsenic, 71% nickel and the balance essentially sulfur was selectively chlorinated at about 600° F. for 50 minutes with a total chlorine addition to the charge, as indicated by the weight increase thereof during chlorination, of about 3.6 weight percent of the charge which is also equivalent to about 2 times the theoretical amount necessary to form chlorides of the contained impurities. The selectively chlorinated material was slurried with water at 20% solids and gaseous chlorine was passed through the slurry to maintain a redox potential of plus 525 millivolts while the temperature of the slurry was maintained at 70° F. The slurry was immediately separated from the pregnant leach solution and the residue of purified nickel sulfide was dried and directly converted to metallic nickel. Direct converting of the nickel sulfide was accomplished autogenously by directing a stream of oxygen upon the surface of a molten bath made of the purified nickel sulfide while maintaining the molten bath in a state of agitation until substantially all of the sulfur content was removed. The product obtained by the oxygen converting operation was metallic nickel or pig nickel containing, by weight, 0.30% cobalt, 0.12% copper, 0.14% iron, less than 0.0005% lead, 0.038% arsenic, 0.01% sulfur and the balance essentially nickel.

The term nickel sulfidic material as employed in the specification is a material containing, by weight, up to a molten bath of purified nickel sulfide with oxygen in accordance with the teachings of U.S. Patent No. 3,069,254. Metallic nickel or pig nickel produced by the process of the latter patent has a wide range of utility. Pig nickel can advantageously be employed as an alloying addition in the preparation of alloy steels or as a starting material for the preparation of nickel base high temperature alloys. Other areas of application of metallic nickel produced by autogenously converting nickel sulfide purified by our invention to metallic nickel are in the field of electroplating and in the field of industrial chemicals for the formation of nickel salts.

Although the present invention has been described in conjunction with preferred embodiments, it is to be understood that modifications and variations may be resorted to without departing from the spirit and scope of the invention, as those skilled in the art will readily understand. Such modifications and variations are considered to be within the purview and scope of the invention and appended claims.

We claim:
1. A process for purifying nickel sulfidic materials comprising heating a nickel sulfidic material containing at least one impurity from the group consisting of copper, cobalt, lead, arsenic and iron to a temperature of about 400° F. to about 700° F., treating the heated material with a small but effective amount of gaseous chlorine but not more than about 4 times the stoichiometric amount of chlorine required to form a chloride of the impurity to chlorinate said impurity, cooling the treated material and leaching said chlorinated impurity from the cooled material to produce purified nickel sulfide.

2. A process as described in claim 1 wherein the leaching comprises a first stage water leach to remove cobalt and a second stage leach with a lixiviant from the group consisting of chlorine water and an ammoniacal ammonium carbonate solution to remove any copper, lead and arsenic.

3. A process for purifying nickel sulfidic material comprising heating a nickel sulfidic material containing at least one impurity from the group consisting of copper, cobalt, lead, arsenic and iron to a temperature of about 400° F. to about 700° F., treating the heated material with a small but effective amount of chlorine diluted with an inert gas but no more than about 4 times the stoichiometric amount of chlorine required to form a chloride of the impurity to chlorinate said impurity, cooling the treated material and leaching said chlorinated impurity from the cooled material to produce purified nickel sulfide.

4. A process as defined in claim 3 wherein the leaching comprises a first stage water leach to remove cobalt and a second stage leach with a lixiviant from the group consisting of water through which chlorine is bubbled and an ammoniacal ammonium carbonate solution to remove any copper, lead and arsenic.

5. A process as described in claim 4 wherein the water leach comprises slurrying the cooled material with water and heating the slurry to a temperature of about 70° F. to about 200° F.

6. A process as described in claim 4 wherein residue resulting from the water leach is slurried with water and the aqueous slurry is treated with chlorine at a temperature below about 80° F.

7. A process as described in claim 4 wherein residue resulting from the water leach is further leached with an ammoniacal ammonium carbonate solution with aeration at a temperature of about 70° F. to about 140° F.

8. A process for purifying a nickel sulfide concentrate from a matte separation process comprising heating a nickel sulfide concentrate containing at least one impurity from the group consisting of up to about 3% copper, up to about 5% cobalt, up to about 0.1% lead, up to about 0.1% arsenic and up to about 0.5% iron to a temperature of about 400° F. to about 700°F., treating the heated concentrate with a small but effective amount of chlorine but not more than about 4 times the stoichiometric amount of chlorine required to form a chloride of the impurity to chlorinate said impurity, cooling the treated concentrate and leaching said chlorinated impurity from the cooled concentrate to produce purified nickel sulfide.

9. A process as defined in claim 8 wherein the amount of chlorine but not more than about 4 times the amount required to combine with the impurities contained in the nickel sulfide concentrate.

10. A process as defined in claim 8 wherein the leaching comprises a first stage water leach to remove cobalt and a second stage leach with a lixiviant from the group consisting of water through which chlorine is bubbled and an ammoniacal ammonium carbonate solution to remove copper, lead and arsenic.

11. A process for purifying nickel sulfidic material comprising heating a crude nickel sulfidic material to a temperature of about 400° F. to about 700° F., treating the heated material with a small but effective amount of chlorine but not more than about 4 times the amount of chlorine required to chlorinate impurities to selectively chlorinate impurities contained therein, and leaching the selectively chlorinated impurities by forming a slurry of the selectively chlorinated material with water and bubbling chlorine through the slurry to dissolve the selectively chlorinated impurities and to produce purified nickel sulfide.

12. A process as described in claim 11 wherein the crude nickel sulfidic material contains impurities from the group consisting of copper, cobalt, lead, arsenic and iron.

13. A process as described in claim 11 wherein about 1 to about 4 times the theoretical amount of chlorine required to combine with said chlorinatable impurities contained in said nickel sulfidic material is employed in the selective chlorination step.

14. A process as described in claim 11 wherein chlorine is bubbled through the slurry at such a rate as to maintain a redox potential of about plus 400 to about plus 600 millivolts.

15. A process as described in claim 11 wherein the temperature of the slurry is controlled to be below about 80° F.

16. A process as described in claim 11 wherein the purified nickel sulfide is separated from the chlorine water leach solution within a period not exceeding about 20 minutes.

17. A process for purifying nickel sulfidic material comprising heating crude nickel sulfidic material to a temperature of about 400° F. to about 700° F., treating the heated material with a small but effective amount of chlorine but not more than about 4 times the amount of chlorine required to chlorinate impurities to selectively chlorinate impurities contained therein, and leaching the selectively chlorinated material by forming a slurry of the selectively chlorinated material with an ammoniacal ammonium carbonate solution to dissolve the selectively chlorinated impurities and to produce purified nickel sulfide.

18. A process as described in claim 17 wherein the crude nickel sulfidic material contains impurities from the group consisting of cobalt, copper, lead and arsenic.

19. A process as described in claim 17 wherein about 1 to about 4 times the theoretical amount of chlorine required to combine with said chlorinatable impurities in said nickel sulfidic material is employed in the selective chlorination step.

20. A process as described in claim 17 wherein the ammoniacal ammonium carbonate leach solution is controlled to have a redox potential of up to about plus 200 millivolts by blowing air through the slurry.

21. A process as described in claim 17 wherein the temperature of the slurry is maintained at a temperature of about 70° F. to about 140° F.

22. A process as described in claim 17 wherein the purified nickel sulfide is separated from said ammoniacal ammonium carbonate solution within a period not exceeding about 20 minutes.

References Cited

UNITED STATES PATENTS

| | | | |
|---|---|---|---|
| 3,117,860 | 1/1964 | Bjerkerud et al. | 75—121 |
| 1,491,653 | 4/1924 | Ashcroft | 75—113 |
| 1,480,439 | 1/1924 | Hamilton | 75—113 |
| 1,440,186 | 12/1922 | Sulman et al. | 75—103 |
| 1,049,746 | 1/1913 | Malm | 75—112 |
| 1,006,355 | 10/1911 | Carpenter et al. | 75—113 |
| 922,388 | 5/1909 | Carpenter | 75—1 |
| 890,432 | 6/1908 | Masson | 75—121 |
| 874,496 | 12/1907 | Gates et al. | 75—113 |
| 1,238,298 | 8/1917 | Johnson. | |

L. DEWAYNE RUTLEDGE, Primary Examiner

T. R. FRYE, Assistant Examiner

U.S. Cl. X.R.

75—101, 103, 112, 114, 117, 121.